United States Patent
Ahn et al.

(10) Patent No.: US 10,773,219 B2
(45) Date of Patent: Sep. 15, 2020

(54) POLYMERIC WATER-SEPARATION MEMBRANCE CONTAINING SULFONATED INORGANIC PARTICLES

(71) Applicant: RESEARCH COOPERATION FOUNDATION OF YEUNGNAM UNIVERSITY, Gyeongsangbuk-do (KR)

(72) Inventors: Young Ho Ahn, Gyeongsangbuk-do (KR); Sivasankaran Ayyaru, Gyeongsangbuk-do (KR)

(73) Assignee: RESEARCH COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 0 days.

(21) Appl. No.: 16/325,025

(22) PCT Filed: Dec. 27, 2016

(86) PCT No.: PCT/KR2016/015329
§ 371 (c)(1),
(2) Date: Feb. 12, 2019

(87) PCT Pub. No.: WO2018/030596
PCT Pub. Date: Feb. 15, 2018

(65) Prior Publication Data
US 2019/0224632 A1   Jul. 25, 2019

(30) Foreign Application Priority Data
Aug. 12, 2016   (KR) ........................ 10-2016-0102974

(51) Int. Cl.
*B01D 69/14*   (2006.01)
*C02F 1/44*   (2006.01)
(Continued)

(52) U.S. Cl.
CPC ......... *B01D 69/148* (2013.01); *B01D 61/145* (2013.01); *B01D 71/024* (2013.01);
(Continued)

(58) Field of Classification Search
CPC .. B01D 61/027; B01D 61/145; B01D 61/147; B01D 69/08; B01D 69/148;
(Continued)

(56) References Cited

U.S. PATENT DOCUMENTS

2012/0309857 A1* 12/2012 Hwang ................. C08J 5/22
                                                            521/27
2016/0260994 A1*  9/2016 Kong ..................... H01M 8/20
2016/0276688 A1*  9/2016 Chu ..................... H01M 8/1025

FOREIGN PATENT DOCUMENTS

CN          104437122        3/2015
KR       10-2004-0089886    12/2005
(Continued)

OTHER PUBLICATIONS

English translation Korean Unexamined Patent Publication No. 10-2014-0112595 A (Sep. 2014).*
(Continued)

*Primary Examiner* — John Kim
(74) *Attorney, Agent, or Firm* — Hauptman Ham, LLP

(57) ABSTRACT

The present invention relates to: a polymer composition for preparing a hydrophilic separation membrane, containing sulfonated inorganic particles, preferably, sulfonated titanium dioxide; and a hydrophilic separation membrane prepared therefrom. The hydrophilic separation membrane of the present invention has advantages of having excellent water flux and an excellent antifouling property.

11 Claims, 1 Drawing Sheet

(51) Int. Cl.
  *B01D 71/02* (2006.01)
  *B01D 61/14* (2006.01)
  *B01D 61/02* (2006.01)
  *C08K 3/22* (2006.01)
  *C08K 9/02* (2006.01)
  *C08L 81/06* (2006.01)
  *C08J 5/18* (2006.01)
  *B01D 71/68* (2006.01)
  *B01D 69/08* (2006.01)

(52) U.S. Cl.
  CPC ............ *B01D 71/68* (2013.01); *C02F 1/44* (2013.01); *C02F 1/442* (2013.01); *C02F 1/444* (2013.01); *C08J 5/18* (2013.01); *C08K 3/22* (2013.01); *C08K 9/02* (2013.01); *C08L 81/06* (2013.01); *B01D 61/027* (2013.01); *B01D 61/147* (2013.01); *B01D 69/08* (2013.01); *B01D 2325/02* (2013.01); *B01D 2325/36* (2013.01); *B01D 2325/48* (2013.01); *C02F 2303/20* (2013.01); *C08J 2381/06* (2013.01); *C08J 2439/06* (2013.01); *C08K 2003/2241* (2013.01); *C08K 2201/003* (2013.01)

(58) Field of Classification Search
  CPC .. B01D 71/024; B01D 71/68; B01D 2325/02; B01D 2325/36; B01D 2325/48; C02F 1/44; C02F 1/442; C02F 1/444; C02F 2303/20; C08L 81/06; C08K 9/02; C08K 3/22; C08K 2201/003; C08K 2201/005; C08K 2003/2241; C08J 5/18; C08J 5/2256; C08J 2381/06; C08J 2439/06
  See application file for complete search history.

(56) References Cited

FOREIGN PATENT DOCUMENTS

| KR | 10-0994178 | 11/2010 |
|---|---|---|
| KR | 10-2010-0078741 | 8/2012 |
| KR | 10-1357670 | 1/2014 |
| KR | 10-2014-0112595 | 11/2014 |

OTHER PUBLICATIONS

International Search Report from corresponding International Application No. PCT/KR2016/015329, dated May 8, 2017, pp. 1-2, Korean Intellectual Property Office, Daejeon, Republic of Korea.

* cited by examiner

POLYMERIC WATER-SEPARATION MEMBRANE CONTAINING SULFONATED INORGANIC PARTICLES

TECHNICAL FIELD

The present invention relates to an ultrafiltration membrane including sulfonated inorganic particles, preferably sulfonated titanium dioxide, to be capable of exhibiting excellent hydrophilicity, high porosity, and an excellent antifouling property.

BACKGROUND ART

In recent years, a separation membrane for water treatment has attracted attention as a technology for treating water by an environmentally friendly method. This separation membrane has been applied to various water treatment fields such as domestic wastewater treatment, factory wastewater treatment, ultrapure water production, desalination of seawater, and the like. The separation membrane for water treatment is largely classified into a microfiltration membrane, an ultrafiltration membrane, a hollow fiber membrane, a nanofiltration membrane, or a reverse osmosis membrane depending on purposes, and these membranes may be mixed and used as needed.

The separation membrane for water treatment may be largely classified into a separation membrane using a cellulose-based hydrophilic polymer such as cellulose acetate, cellulose nitrate, or the like, and a separation membrane using a hydrophobic polymer such as polyethylene, polypropylene, polysulfone, polyethersulfone, polyvinylidene fluoride, polytetrafluoroethylene, or the like.

The hydrophilic polymer has activated interaction with water molecules due to hydrogen bonding, or the like, and thus water permeates easily into the hydrophilic polymer, thus resulting in high water flux. However, the hydrophilic polymer is sensitive to heat and chemicals, and has a problem in that polymer chains are easily separated by an enzyme included in a subject fluid to be treated, or the like, and thus the membrane is destroyed.

The hydrophobic polymer is generally resistant to heat and chemicals and has excellent physical properties such as mechanical strength, and the like. However, the hydrophobic polymer has problems in that water flux is remarkably low due to hydrophobicity, and the hydrophobic polymer is contaminated more easily than the hydrophilic polymers by contaminants such as proteins and the like. In order to solve these problems of the hydrophobic polymer, various methods such as a method of including inorganic particles such as titanium dioxide or the like, a method of treating a functional group such as a carboxyl group on a surface of a separation membrane, and a method of treating a hydrophilic polymer such as polyvinyl alcohol or the like, at the time of preparing the separation membrane, have been proposed. However, these methods still have problems in that water flux is low due to relatively low hydrophilicity of the separation membrane, and the separation membrane is vulnerable to contamination.

Korean Patent No. 10-0994178 also discloses a polyethersulfone composite membrane including titanium dioxide particles, but has a problem in that since hydrophilicity of the composite membrane prepared by mixing the titanium dioxide particles is only partially improved, water flux is still low for application to a large amount of water treatment at a time.

DISCLOSURE

Technical Problem

The present invention is provided to solve the above-described problems.

An object of the present invention is to provide a polymer composition for preparing a hydrophilic separation membrane having high hydrophilicity.

Another object of the present invention is to provide a polymer composition for preparing a hydrophilic separation membrane having high water flux.

Still another object of the present invention is to provide a polymer composition for preparing a hydrophilic separation membrane having an excellent antifouling property.

Still another object of the present invention is to provide a polymer composition for preparing a hydrophilic separation membrane having high porosity.

Technical Solution

In one general aspect, a polymer composition for preparing a hydrophilic separation membrane includes: sulfonated inorganic particles; and a base resin.

The sulfonated inorganic particle may be sulfonated titanium dioxide.

In the sulfonated titanium dioxide particle, an atomic ratio of sulfur atoms to titanium atoms on a particle surface may be 10 to 40%.

The sulfonated titanium dioxide particle may have an average particle diameter of 10 to 700 nm.

The base resin may be one or two or more selected from the group consisting of a hydrophobic polysulfone-based polymer, a hydrophobic halogenated polymer, a hydrophobic polyolefin-based polymer, a polyacrylonitrile-based polymer, and a polyimine-based polymer.

The base resin may be sulfonated.

The polysulfone-based polymer may be one or two or more selected from the group consisting of polyether sulfone and polysulfone.

The polymer composition for preparing a hydrophilic separation membrane may further include: one or two or more additives selected from the group consisting of a water-soluble polymer and a water-soluble salt.

The polymer composition for preparing a hydrophilic separation membrane may include 0.1 to 20% by weight of the sulfonated inorganic particles, 5 to 40% by weight of the base resin, 0.1 to 15% by weight of the additive, and a remaining amount of a solvent.

In another general aspect, there is a hydrophilic separation membrane prepared from the polymer composition for preparing a hydrophilic separation membrane as described above.

The hydrophilic separation membrane may satisfy Equation 1 below:

$$\frac{F_{STiO_2}}{F_{TiO_2}} \geq 1.3 \qquad \text{[Equation 1]}$$

in Equation 1 above, $F_{STiO_2}$ is water flux (L/m²·h) of the hydrophilic separation membrane, and $F_{TiO_2}$ is water flux (L/m²·h) of a separation membrane including non-sulfonated titanium dioxide.

The hydrophilic separation membrane may be an ultrafiltration membrane, a microfiltration membrane, a hollow fiber membrane, or a nanofiltration membrane.

Advantageous Effects

A hydrophilic separation membrane prepared using a polymer composition for preparing a hydrophilic separation membrane of the present invention has an advantage of high hydrophilicity.

The hydrophilic separation membrane prepared using a polymer composition for preparing a hydrophilic separation membrane of the present invention has an advantage of excellent water flux.

The hydrophilic separation membrane prepared using a polymer composition for preparing a hydrophilic separation membrane of the present invention has an advantage of an excellent antifouling property.

The hydrophilic separation membrane prepared using a polymer composition for preparing a hydrophilic separation membrane of the present invention has an advantage of high porosity.

BEST MODE

Figure 1:
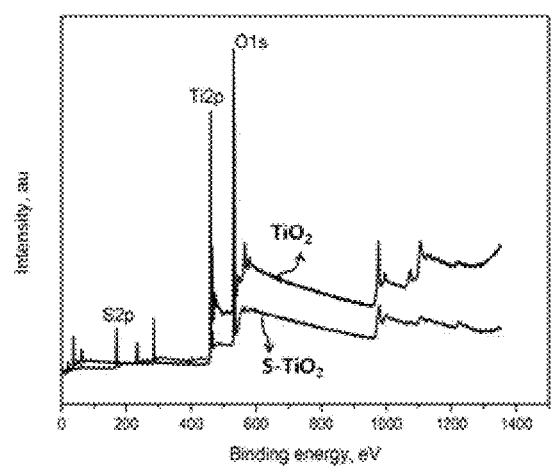
FIG. 1 is a graph showing an X-ray photoelectron spectroscopy analysis of sulfonated titanium dioxide according to an embodiment of the present invention.

Hereinafter, a polymer composition for preparing a hydrophilic separation membrane according to the present invention is described in detail with reference to the accompanying drawings. The drawings to be provided below are provided by way of example so that the idea of the present invention can be sufficiently transferred to those skilled in the art to which the present invention pertains. Therefore, the present invention is not limited to the following drawings, but may be embodied in other forms, and the following drawings may be exaggerated in order to clarify the spirit of the present invention. Technical terms and scientific terms used in the present specification have the general meaning understood by those skilled in the art to which the present invention pertains unless otherwise defined, and a description for the known function and configuration obscuring the present invention will be omitted in the following description and the accompanying drawings.

In the conventional separation membrane for water treatment, when a polymer resin such as polyethersulfone, polyvinylidene fluoride, or the like, is used for a high mechanical strength, it is difficult for water to permeate due to low hydrophilicity, and the separation membrane is easily contaminated by contaminants included in a subject fluid to be treated.

Thus, the present applicant researched for a long period of time to prepare a separation membrane for water treatment having high hydrophilicity and not being easily contaminated, and as a result, found that when a separation membrane was prepared by mixing sulfonated inorganic particles, preferably sulfonated titanium dioxide, the separation membrane had increased hydrophilicity and an enhanced antifouling property, and completed the present invention.

Thus, the present invention relates to a polymer composition for preparing a hydrophilic separation membrane including sulfonated inorganic particles and a base resin.

When a hydrophilic separation membrane is prepared by using the polymer composition for preparing a hydrophilic separation membrane of the present invention, there is an advantage that it is possible to form a stable separation membrane having excellent hydrophilicity, high water flux, excellent porosity, and an antifouling property.

In the polymer composition for preparing a hydrophilic separation membrane according to an embodiment of the present invention, the inorganic particle may be one or two or more selected from the group consisting of titanium dioxide, zirconium dioxide, aluminum hydroxide, magnesium oxide, zinc oxide, and silicon dioxide.

Preferably, the polymer composition for preparing a hydrophilic separation membrane of the present invention may be a sulfonated $TiO_2$. When the polymer composition includes the sulfonated titanium dioxide particles, it is possible to prepare a hydrophilic separation membrane having excellent antifouling property as well as remarkably improved hydrophilicity by sulfonation treatment, and in addition thereto, an adhesive force with the base resin to be described below is improved, and thus it is possible to form a stable separation membrane. Specifically, when the hydrophilic property is high in the separation membrane, water flux of the prepared separation membrane is remarkably increased, and thus the problem of low water flux, which is a problem of the conventional separation membrane, is capable of being solved. In addition, since the hydrophilic separation membrane of the present invention has an excellent antifouling property, when the hydrophilic separation membrane is applied to an actual water treatment facility, it is easy to perform cleaning, and a replacement cycle is lengthened, thereby reducing the maintenance cost. In addition, there is an advantage that the adhesive force with the base resin to be described below may be improved by the sulfonation treatment, thereby preventing a problem such as elution of the titanium dioxide particles when the separation membrane is used later, and manufacturing a stable hydrophilic separation membrane for a long period of time.

In the sulfonated titanium dioxide according to an embodiment of the present invention, an atomic ratio of sulfur atoms to titanium atoms on a surface of the titanium dioxide particle may be 10 to 40%. When the titanium dioxide is sulfonated in the above-described range, the titanium dioxide may be hydrophilized to improve the hydrophilicity of the prepared separation membrane, and the sulfone group is stably present on a surface of titanium.

A method of preparing the sulfonated inorganic particle according to an embodiment of the present invention is not limited as long as the sulfonated inorganic particle is prepared by sulfonating an inorganic particle. Specifically, a method of treating inorganic particles with an aqueous sulfuric acid solution may be used. More specifically, the inorganic particles may be mixed with the aqueous sulfuric acid solution in an amount of 10 to 100 times by volume based on a volume of the inorganic particles. Here, a concentration of the aqueous sulfuric acid solution may be 0.1 to 1 M, but is not limited thereto. Further, a size of the inorganic particle according to an embodiment of the present invention is not limited as long as the size is within a range in which a hydrophilic separation membrane is capable of being formed by mixing the inorganic particles with a polymer to be described below. Specifically, an average particle diameter of the inorganic particle may be 10 to 700 nm, and more specifically, the average particle diameter thereof may be 10 to 500 nm.

The sulfonated inorganic particles according to an exemplary embodiment of the present invention may be included in an amount of 0.1 to 20% by weight, preferably 1 to 10% by weight, in the total weight of the polymer composition for preparing a hydrophilic separation membrane. When the sulfonated inorganic particles are included within the above-described range, an amount of the sulfonated inorganic particles that are not adhered to the base resin but remain on the prepared separation membrane is small, and the sulfonated inorganic particles are sufficiently included on the separated separation membrane, thereby securing hydrophilicity and an antifouling property of the separation membrane.

In the polymer composition for preparing a hydrophilic separation membrane according to an embodiment of the present invention, the base resin is generally used in a separation membrane, and there is no limitation as long as the base resin is a polymer resin capable of adhering the sulfonated inorganic particles described above. Specifically, the base resin may be one or two or more selected from the group consisting of a polysulfone-based polymer, a halogenated polymer, a polyolefin-based polymer, a polyacrylonitrile-based polymer, and a polyimine-based polymer, and more specifically may be a polysulfone-based polymer. When the hydrophobic polysulfone-based polymer is used as the base resin, dispersibility of the sulfonated inorganic particles in the polymer composition for preparing a hydrophilic separation membrane is remarkably improved due to high interaction with the sulfonated inorganic particles, and thus there are advantages in that the sulfonated inorganic particles are uniformly dispersed in the prepared separation membrane, and the sulfonated inorganic particles are not easily separated after the membrane is prepared, that is, the separation membrane has excellent stability. In addition, this uniform dispersion has an advantage that the water flux and antifouling property of the entire membrane are improved.

In the polymer composition for preparing a hydrophilic separation membrane according to an embodiment of the present invention, the polysulfone-based polymer is not limited as long as it is a polymer compound including a group shown as

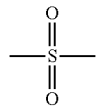

in a monomer, and specifically may be polysulfone, polyethersulfone, or the like. Further, in the polymer composition for preparing a hydrophilic separation membrane according to an embodiment of the present invention, the halogenated polymer refers to a polymer compound including a monomer in which one or more halogen atoms are substituted for hydrogen atoms among monomers of the polymer composition. Examples of the halogenated polymer include polyvinylidene fluoride, polytetrafluoroethylene, polyvinyl chloride, and the like, but the halogenated polymer is not limited thereto. In addition, in the polymer composition for preparing a hydrophilic separation membrane according to an embodiment of the present invention, the polyolefin is not limited as long as the polyolefin is a polymer composition prepared by polymerizing an olefin-based compound, and specifically may be polyethylene or polypropylene. In addition, the polyacrylonitrile-based polymer according to an embodiment of the present invention is not limited as long as the polyacrylonitrile-based polymer is a composition or a copolymer including acrylonitrile or an acrylonitrile derivative as a monomer, and specifically, may be an acrylonitrile homopolymer or a copolymer including 30% by weight or more of acrylonitrile. In addition, the polyimine-based polymer according to an embodiment of the present invention is not limited as long as the polyimine-based polymer is a polymer composition including an imine group as a monomer, and specifically, the polyimine-based polymer may be a polyalkyleneimine, wherein the alkylene is an alkylene group having 1 to 5 carbon atoms.

In the polymer composition for preparing a hydrophilic separation membrane according to an embodiment of the present invention, the base resin may be sulfonated. Specifically, the resin used for the separation membrane may be generally a sulfonated resin, and more specifically, the sulfonated resin may be a sulfonated polysulfone-based polymer, a sulfonated halogenated polymer, and a sulfonated polyolefin-based polymer. Preferably, a base resin that does not include a sulfone group in a monomer may be subjected to sulfonation and may be included in the polymer composition for preparing a hydrophilic separation membrane. When the above-described base resin is subjected to sulfonation and used to prepare the separation membrane, dispersibility is improved due to the high interaction between the base resin that is subjected to sulfonation and the sulfonated inorganic particles, and the sulfonated inorganic particles are uniformly dispersed in the membrane, and thus water flux is more remarkably improved as compared with a case of using a base resin that is not sulfonated.

Here, the sulfonation of the base resin is not limited as long as the sulfonation is a method generally used for sulfonating the polymer, and a method of treating the base resin with sulfuric acid at room temperature may be used. Specifically, sulfuric acid having a high concentration of 95 to 99% and the base resin may be mixed and stirred at room temperature, and more specifically, the base resin and a high concentration sulfuric acid having a weight of 0.5 to 4 times larger than a weight of the base resin may be mixed and stirred for one hour or more.

In the polymer composition for preparing a hydrophilic separation membrane according to an embodiment of the present invention, the base resin described above may be included in an amount of 5 to 40% by weight, and preferably 10 to 25% by weight. When a ratio of the base resin is the same as described above, there are advantages in that porosity is remarkably improved by bonding with the sulfonated inorganic particles, thus resulting in widening a surface area, and phase transition is easily performed in a step of preparing a separation membrane later, thereby forming a separation membrane having a uniform thickness.

The polymer composition for preparing a hydrophilic separation membrane according to an embodiment of the present invention may further include: one or two or more additives selected from the group consisting of a water-soluble polymer and a water-soluble salt. Specifically, the water-soluble polymer may be polyvinylpyrrolidone, polyethylene glycol or polyethyleneimine, but there is no limitation as long as the water-soluble polymer is a polymer composition exhibiting water solubility. The water-soluble salt is not limited as long as the water-soluble salt is a salt dissolved in water such as lithium chloride, sodium chloride, potassium chloride, magnesium chloride, calcium chloride, lithium bromide, sodium bromide, potassium bromide, or the like. However, preferably, as additives, polyvinylpyrrolidone may be used as the water-soluble polymer or lithium chloride may be used as the water-soluble salt.

When the water-soluble polymer or the water-soluble salt as described above is included, if the polymer composition for preparing a hydrophilic separation membrane according to an embodiment of the present invention is used to prepare a hydrophilic separation membrane, formation of pores may be facilitated, and thus it is possible to form a separation membrane having significantly high porosity and water flux. In addition, when the water-soluble polymer is used as an additive, there is an advantage that pores are uniformly formed on the separation membrane prepared by the interaction with the sulfonated inorganic particles.

In the polymer composition for preparing a hydrophilic separation membrane according to an embodiment of the present invention, the additive described above may be included in an amount of 0.1 to 15% by weight, and preferably 0.1 to 10% by weight. When the additive is included within the above-described range, there are advantages in that pores in the separation membrane to be prepared later may be sufficiently secured, and an effect on properties of the separation membrane such as hydrophilicity, water flux, and the like, due to the additive remaining in separation membrane may be minimized.

The polymer composition for preparing a hydrophilic separation membrane according to an embodiment of the present invention may further include a solvent. Here, the solvent is not limited as long as the solvent is a polar aprotic solvent, and specifically may be one or two or more selected from the group consisting of N-methylpyrrolidone, dimethylacetamide, N,N-dimethylformamide, dimethylsulfoxide, tetrahydrofuran, ethyl acetate, acetone, and acetonitrile, and more particularly, may be one or two or more selected from the group consisting of N-methylpyrrolidone, dimethylacetamide, and N,N-dimethylformamide. The solvent may be present in a remaining amount on the polymer composition for preparing a hydrophilic separation membrane when the sulfonated inorganic particles and the base resin are added in the above-described range. Specifically, the solvent may be included in an amount of 55 to 90% by weight, and more specifically 70 to 90% by weight, in the total weight of the polymer composition for preparing a hydrophilic separation membrane. When the solvent is included in the above-described range, there is an advantage that the base resin and the sulfonated inorganic particles may be uniformly dispersed, and the separation membrane may be stably manufactured later.

The preparation of the separation membrane using the polymer composition for preparing a hydrophilic separation membrane according to an embodiment of the present invention is not limited as long as a method generally used for preparation the separation membrane is used, and specifically, the separation membrane may be prepared by using a phase transition method. Specifically, a solvent-non-solvent phase transition method, a heat-induced phase transition method, or a vapor-induced phase transition method may be used, and more specifically, a solvent-non-solvent phase transition method may be used. When the solvent-non-solvent phase transition method is used, the sulfonated inorganic particles are uniformly dispersed, and thus it is possible to manufacture a separation membrane having uniform water flux and antifouling property. Here, a non-solvent used in the solvent-non-solvent phase transition method is not limited as long as the non-solvent is a polar aprotic solvent, and specifically may be water.

The separation membrane prepared by using the polymer composition for preparing a hydrophilic separation membrane according to an embodiment of the present invention has advantages of excellent hydrophilicity, high water flux, and an excellent antifouling property. In detail, the water flux of the separation membrane prepared by using the polymer composition for preparing a hydrophilic separation membrane according to an embodiment of the present invention may be 1.8 times higher than that of a membrane prepared using only the base resin, and may be 1.3 times higher than that of a membrane including non-sulfonated inorganic particles.

Specifically, the hydrophilic separation membrane according to an embodiment of the present invention may satisfy Equation 1 below:

$$\frac{F_{STiO_2}}{F_{TiO_2}} \geq 1.3 \qquad \text{[Equation 1]}$$

in Equation 1 above, $F_{STiO_2}$ is water flux (L/m$^2$·h) of the hydrophilic separation membrane according to an embodiment of the present invention, and $F_{TiO_2}$ is water flux (L/m$^2$·h) of a separation membrane including non-sulfonated titanium dioxide.

In other words, the hydrophilic separation membrane including the sulfonated inorganic particles may have the water flux which is improved by at least 1.3 times and up to 5 times higher than that of the separation membrane including the same amount of non-sulfonated inorganic particles. The remarkable improvement of the water flux has an advantage in that a treatment capacity is capable of being remarkably improved when the separation membrane is actually utilized in water treatment.

Further, the separation membrane prepared by using the polymer composition for preparing a hydrophilic separation membrane according to an embodiment of the present invention has an advantage of an excellent antifouling property. In detail, the separation membrane including the sulfonated base resin and the sulfonated inorganic particles showed a significantly excellent antifouling property (93%). In particular, the antifouling property of the separation membrane prepared by using the polymer composition for preparing a hydrophilic separation membrane according to an embodiment of the present invention may be improved by 20% to 32% or more than that of the separation membrane prepared only using the base resin, and may be improved by 13% or more than that of the separation membrane including non-sulfonated inorganic particles. This improvement of the antifouling property is advantageous in that when the hydrophilic separation membrane is applied to an actual water treatment facility, it is easy to perform cleaning, and a replacement cycle is lengthened, thereby reducing the maintenance cost in the long term aspect.

Hereinafter, the present invention is described in more detail with reference to the following Examples. These Examples to be described below are provided only for assisting in the understanding of the present invention. Therefore, the present invention is not limited to these Examples to be described below.

Example 1

1 g of titanium dioxide (U.S. Research nanomaterial, Inc., TiO$_2$ anatase 99+%, size of 10 to 25 nm, US3490, CAS No. 13463-67-7), 20 ml of methanol, and 15 ml of 0.5 M aqueous sulfuric acid solution were mixed, and the mixture was irradiated with ultrasonic waves at room temperature for 1 hour to prepare sulfonated titanium dioxide.

2 g of the prepared sulfonated titanium dioxide, g of polyethersulfone, 1 g of PVP, and 84 g of N-methylpyrrolidone were mixed to prepare a mixed solution, and the mixed solution was stirred for 48 hours or more so as to be uniformly dispersed.

The prepared mixed solution was allowed to stand at room temperature for 9 hours or more so as to remove air bubbles, and this solution was made to be a casting solution on a glass plate with a thickness of 150 to 250 μm using a casting knife and immersed in a coagulation bath filled with water at 15 to 25° C. The immersed separation membrane was washed with water at 50° C. for 30 minutes to prepare a hydrophilic separation membrane (PES-STiO$_2$).

Example 2

A hydrophilic separation membrane (SPES-STiO2) was prepared in the same manner as in Example 1 except that sulfonated polyethersulfone was used instead of polyethersulfone in the same amount. Here, sulfonation treatment of polyethersulfone was performed by mixing 100 ml of sulfuric acid (98%) and 10 g of polyethersulfone and stirring the mixture at room temperature for 1 hour or more. The sulfonated base resin (S-PES) was precipitated with ice-cold de-ionized water under gradually rapid stirring, and the resulting precipitate was recovered by filtration and washed repeatedly with deionized water two to three times.

7.5 g of polyethersulfone, 7.5 g of sulfonated polyethersulfone, 1 g of polyvinylpyrrolidone, and 84 g of N-methylpyrrolidone were mixed to prepare a mixed solution, and then the mixed solution was immersed in water in the same manner as in Example 1 to prepare a separation membrane.

Comparative Example 1

15 g of polyethersulfone, 1 g of polyvinylpyrrolidone, and 84 g of N-methylpyrrolidone were mixed to prepare a mixed solution, and then the mixed solution was immersed in water in the same manner as in Example 1 to prepare a separation membrane (PES).

Comparative Example 2

A hydrophilic separation membrane (PES-TiO2) was prepared in the same manner as in Example 1 except that non-sulfonated titanium dioxide was mixed in the same amount.

Comparative Example 3

A hydrophilic separation membrane (SPES-TiO2) was prepared in the same manner as in Example 2 except that non-sulfonated titanium dioxide was mixed in the same amount.

[Confirmation of Sulfonation of Titanium Dioxide]

The degree of sulphonation of the sulphonated titanium dioxide prepared in Example 1 was confirmed by X-ray photoelectron spectroscopy and shown in FIG. 1.

Experimental instrument: K-Alpha manufactured by Thermo Scientific, U.K.

Analysis method: Irradiation of energy of 30 eV was performed using an aluminum Kα line as an X-ray source.

Analysis software: Thermo Scientific Advantage software, ver 5.932

Referring to FIG. 1, it could be seen that a peak indicating S2p bonding was generated near 170 eV, and it could be confirmed that titanium dioxide was sulfonated based on this finding.

[Observation of Cross-Section of the Prepared Separation Membrane]

Figure 2:
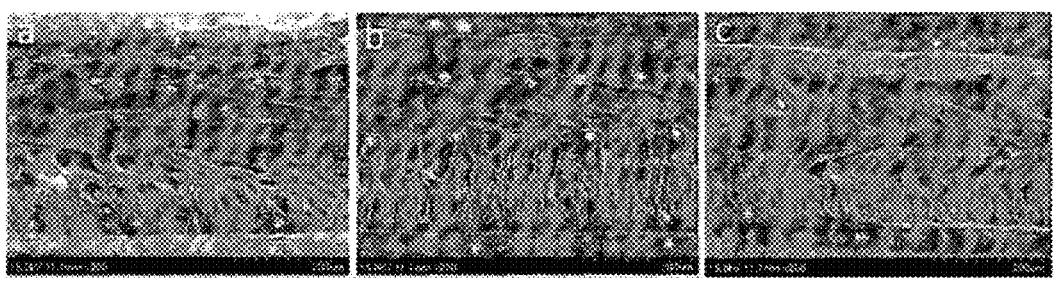
FIG. 2 is scanning electron microscope (SEM) images of cross-sections of hydrophilic separation membranes according to Example and Comparative examples of the present invention.

Cross-sections of the separation membranes of Example 1, Comparative Example 1, and Comparative Example 2 were observed through a scanning electron microscope and shown in FIG. 2. CSPM 5500 manufactured by AFM company was used. In FIG. 2, Comparative Example 1, Comparative Example 2, and Example 1 were indicated by a, b, and c, respectively.

[Water Flux Experiment]

The water flux of each of Examples 1 to 2 and Comparative Examples 1 to 3 was measured using a self-manufactured cross-flow filtration reactor. The used cross-flow filtration reactor had an internal diameter of 6 cm and an internal effective area of 28.26 cm$^2$. The separation membrane was mounted on the water flux equipment, and the equipment was operated at a pressure of 0.15 MPa. A water flux amount per time and area of each membrane was measured and shown in Table 1.

Referring to results shown in Table 1 below, it could be appreciated that the water flux of Examples 1 and 2 in which titanium dioxide was subjected to sulfonation treatment was significantly higher than the case in which titanium dioxide was not subjected to sulfonation treatment, and it could be confirmed that the water flux of Examples 1 and 2 increased up to 2.68 times higher than that of the pure base resin.

TABLE 1

| Separation Membrane | Water Flux (L/m$^2$ · h) |
| --- | --- |
| Example 1 | 755 |
| Example 2 | 940 |
| Comparative Example 1 | 350 |
| Comparative Example 2 | 560 |
| Comparative Example 3 | 670 |

[Antifouling Property Experiment]

The antifouling property experiment of each separation membrane was divided into three stages. Each separation membrane was mounted on a cross-flow filtration reactor, and then the water flux was measured (first water flux) while distilled water was allowed to permeate for 30 minutes. Then, 0.5 g/L of bovine serum albumin (BSA) solution was allowed to permeate through each of the separation membranes for 30 minutes, and then the water flux for distilled water of each separation membrane was measured again for 30 minutes (second water flux). Based on the measured results, the antifouling properties of Examples 1 to 2 and Comparative Examples 1 to 3 were calculated using the following Equation 2 and shown in Table 2.

Referring to Table 2, when the hydrophilic separation membrane including the sulfonated titanium dioxide was prepared, it could be confirmed that the water flux was maintained at a high level even though contaminants permeated, thus resulting in high antifouling property.

$$\text{(Antifouling Property)} = \frac{\text{(Second Water Flux)}}{\text{(First Water Flux)}} \times 100 \qquad \text{[Equation 2]}$$

TABLE 2

| Separation Membrane | Antifouling Property (%) |
|---|---|
| Example 1 | 83% |
| Example 2 | 93% |
| Comparative Example 1 | 61% |
| Comparative Example 2 | 70% |
| Comparative Example 3 | 79% |

The invention claimed is:

1. A polymeric water-separation membrane having high porosity comprising:
   sulfonated inorganic particles; and
   a base resin,
   wherein the sulfonated inorganic particles are one or two or more selected from the group consisting of sulfonated titanium dioxide, sulfonated zirconium dioxide, sulfonated aluminum hydroxide, sulfonated magnesium oxide, sulfonated zinc oxide, and sulfonated silicon dioxide,
   wherein the base resin is one or two or more selected from the group consisting of a polysulfone-based polymer, a halogenated polymer, a polyolefin-based polymer, a polyacrylonitrile-based polymer, and a polyimine-based polymer,
   wherein the base resin and the sulfonated inorganic particles are uniformly dispersed.

2. The polymeric water-separation membrane of claim 1, wherein the sulfonated inorganic particle is a sulfonated titanium dioxide.

3. The polymeric water-separation membrane of claim 2, wherein in the sulfonated titanium dioxide particle, an atomic ratio of sulfur atoms to titanium atoms on a particle surface is 10 to 40%.

4. The polymeric water-separation membrane of claim 1, wherein the sulfonated inorganic particle has an average particle diameter of 10 to 700 nm.

5. The polymeric water-separation membrane of claim 1, wherein the base resin is sulfonated.

6. The polymeric water-separation membrane of claim 1, wherein the polysulfone-based polymer is one or two or more selected from the group consisting of polyether sulfone and polysulfone.

7. The polymeric water-separation membrane of claim 1, further comprising:
   one or two or more additives selected from the group consisting of a water-soluble polymer and a water-soluble salt.

8. The polymeric water-separation membrane of claim 7, wherein the polymeric water-separation membrane is prepared from a polymer composition including 0.1 to 20% by weight of the sulfonated inorganic particles, 5 to 40% by weight of the base resin, 0.1 to 15% by weight of the additive, and a remaining amount of a solvent.

9. The polymeric water-separation membrane of claim 1, wherein the polymeric water-separation membrane satisfies Equation 1 below:

$$\frac{F_{STiO_2}}{F_{TiO_2}} \geq 1.3 \qquad \text{[Equation 1]}$$

in Equation 1 above, $F_{STiO_2}$ is water flux (L/m$^2$·h) of the polymeric water-separation membrane, and $F_{TiO_2}$ is water flux (L/m$^2$·h) of a separation membrane including non-sulfonated titanium dioxide.

10. The polymeric water-separation membrane of claim 1, wherein the polymeric water-separation membrane is an ultrafiltration membrane, a microfiltration membrane, a hollow fiber membrane, or a nanofiltration membrane.

11. A polymeric water-separation membrane having high porosity, comprising:
   sulfonated inorganic particles; and
   a base resin,
   wherein the sulfonated inorganic particles are one or two or more selected from the group consisting of sulfonated titanium dioxide, sulfonated zirconium dioxide, sulfonated aluminum hydroxide, sulfonated magnesium oxide, sulfonated zinc oxide, and sulfonated silicon dioxide,
   wherein the base resin is one or two or more selected from the group consisting of a polysulfone-based polymer, a halogenated polymer, a polyolefin-based polymer, a polyacrylonitrile-based polymer, and a polyimine-based polymer,
   wherein the base resin and the sulfonated inorganic particles are uniformly dispersed,
   wherein the polymeric water-separation membrane is prepared by using a solvent-non-solvent phase transition method.

* * * * *